US009298767B1

(12) United States Patent
Braksator et al.

(10) Patent No.: US 9,298,767 B1
(45) Date of Patent: *Mar. 29, 2016

(54) CALCULATING STATE OF CRYPTOGRAPHIC OBJECTS AND GENERATING SEARCH FILTER FOR QUERYING CRYPTOGRAPHIC OBJECTS

(71) Applicant: International Business Machines Corporation, Armonk, NY (US)

(72) Inventors: Mark J. Braksator, Corona, CA (US); Bruce A. Rich, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 95 days.

This patent is subject to a terminal disclaimer.

(21) Appl. No.: 14/294,257

(22) Filed: Jun. 3, 2014

Related U.S. Application Data

(63) Continuation of application No. 12/963,184, filed on Dec. 8, 2010, now Pat. No. 8,788,545.

(51) Int. Cl.
*G06F 17/30* (2006.01)
*G06F 21/62* (2013.01)

(52) U.S. Cl.
CPC ...... *G06F 17/30407* (2013.01); *G06F 21/6218* (2013.01)

(58) Field of Classification Search
CPC .............. G06F 12/1408; G06F 21/602; G06F 17/30407
USPC .......... 707/758, 764, 768, 728, 707, 748, 749
See application file for complete search history.

(56) References Cited

U.S. PATENT DOCUMENTS 6,363,377 B1    3/2002  Kravets et al.
6,868,407 B1 *  3/2005  Pierce .................. G06Q 20/382
                                                    705/50

(Continued)

FOREIGN PATENT DOCUMENTS

WO   WO2006/075899 A1   7/2006

OTHER PUBLICATIONS

Bjorkqvist, Mathias et al., "Design and Implementation of a Key-Lifecycle Management System", http://www.zurich.ibm.com/~cca/papers/klm.pdf, Mar. 23, 2010, 21 pages.

(Continued)

*Primary Examiner* — James Trujillo
*Assistant Examiner* — Fatima Mina
(74) *Attorney, Agent, or Firm* — Stephen R. Tkacs; Stephen J. Walder, Jr.; Parashos Kalaitzis

(57) ABSTRACT

Mechanisms are provided for calculating state of cryptographic objects and generating search filters for querying cryptographic objects based on the given state or on the given combination of unique states. The mechanism to calculate a state of a cryptographic object allows an application or system to resolve the current state of any cryptographic object with the following set of state altering date values: initial date, activation date, deactivation date, compromise date, and destroy date. A processing module may retrieve the state meta-data and calculate the current state of a given cryptographic object. The current state may be, for example, one of the following: unknown, pre-active, active, deactivated, compromised, destroyed, and destroyed-compromised. The mechanism to generate a search filter may generate a search query language (SQL) search filter to query for cryptographic objects using the state altering date values stored for each object.

17 Claims, 8 Drawing Sheets

(56) References Cited

U.S. PATENT DOCUMENTS

| | | | |
|---|---|---|---|
| 7,120,696 B1 * | 10/2006 | Au | H04L 9/12 380/260 |
| 7,324,647 B1 * | 1/2008 | Elliott | H04B 10/70 370/390 |
| 7,415,059 B2 * | 8/2008 | Chadha et al. | 375/343 |
| 7,490,065 B1 | 2/2009 | Ogg et al. | |
| 7,681,230 B2 | 3/2010 | O'Brien | |
| 7,873,166 B2 * | 1/2011 | Robinson | H04L 9/0662 380/277 |
| 8,139,770 B2 * | 3/2012 | Zheng | H04L 9/0894 380/277 |
| 8,301,510 B2 | 10/2012 | Boesch | |
| 8,370,643 B2 | 2/2013 | Miyazaki et al. | |
| 8,378,849 B2 * | 2/2013 | Chandra et al. | 340/905 |
| 2004/0125988 A1 * | 7/2004 | Coetzee et al. | 382/112 |
| 2005/0120239 A1 | 6/2005 | Monroe et al. | |
| 2007/0028110 A1 | 2/2007 | Brennan | |
| 2007/0100834 A1 | 5/2007 | Landry et al. | |
| 2007/0233602 A1 * | 10/2007 | Zweig et al. | 705/51 |
| 2008/0077794 A1 * | 3/2008 | Arnold et al. | 713/169 |
| 2008/0310619 A1 | 12/2008 | Scheidt et al. | |
| 2009/0187963 A1 | 7/2009 | Bori | |
| 2009/0198685 A1 | 8/2009 | Bartholomew | |
| 2011/0047056 A1 * | 2/2011 | Overman et al. | 705/35 |
| 2012/0150897 A1 | 6/2012 | Braksator et al. | |

OTHER PUBLICATIONS

Denning, Dorothy E. "Cryptographic Checksums for Multilevel Database Security", IEEE Symposium on Security and Privacy, Oakland, Calif., Apr. 30-May 2, 1984, 10 pages.

Kaplan, Ian, "A Semantic Graph Query Language", Lawrence Livermore National Library, UCRL-TR-225447, Oct. 17, 2006, 18 pages.

Ku, Wei-Shinn et al., "Query Integrity Assurance of Location-Based Services Accessing Outsourced Spatial Databases", Dept. of Computer Science and Software Engineering, Auburn University, 2007-2008, 18 pages.

McCamant, Stephen et al., "Quantitative Information Flow as Network Flow Capacity", ACM, Jun. 2008, pp, 193-205.

Montana, David et al., "Validation Algorithms for Secure Internet Routing PKI", BBN Technologies, 2006-2007, 14 pages.

* cited by examiner

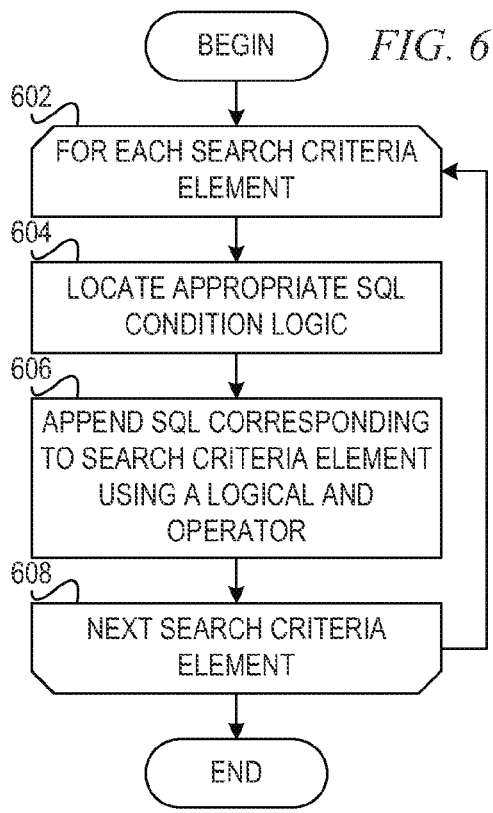

```
/**
* Method calculates a current state for the given cryptographic object
* @param cobj - cryptographic object
* @param now - current time
* @return Integer value representing a state of the cryptographic object where
* 0 = UNKNOWN,
* 1 = PRE_ACTIVE,
* 2 = ACTIVE,
* 3 = DEACTIVATED,
* 4 = COMPROMISED,
* 5 = DESTROYED,
* 6 = DESTROYED_COMPROMISED
*/
public static int getState(CryptographicObject cobj, Date now) {
        Date initialD = cobj.initialDate;
        Date activationD = cobj.activationDate;
        Date destroyD = cobj.destroyDate;
        Date compromiseD = cobj.compromiseDate;
        Date deactivationD = cobj.deactivationDate;
```

*FIG. 7B*

```
        if (destroyD != null) {
                // object has been destroyed
                // see if it was destroyed-compromised
                if (compromiseD != null) {
                        if (destroyD.getTime() >= compromiseD.getTime()) {
                                // state is DESTROYED_COMPROMISED
                                return 6;
                        }
                }
                // state is DESTROYED
                return 5;
        }
        if (compromiseD != null) {
                // state is COMPROMISED
                return 4;
        }
        if (deactivationD != null) {
                if (deactivationD.getTime() <= now.getTime()) {
                        // state is DEACTIVATED
                        return 3;
                }
        }
        if (activationD == null) {
                if(initialD != null) {
                        // state is PRE_ACTIVE
                        return 1;
                }
        } else {
                if (activationD.getTime() <= now.getTime()) {
                        // state is ACTIVE
                        return 2;
                } else {
                        // state is PRE_ACTIVE
                        return 1;
                }
        }
        // state is UNKNOWN
        return 0;
}
```

*FIG. 8A*

```
/**
 * Method generates a SQL search filter to search for cryptographic
 * objects using given state values, which will be translated to SQL using
 * a set of state altering dates and current time.
 *
 * @param stateValues
 * - combination of unique integer values to use in the search
 * where each value is one of the following: 1 = PRE_ACTIVE, 2 =
 * ACTIVE, 3 = DEACTIVATED, 4 = COMPROMISED, 5 = DESTROYED, 6 =
 * DESTROYED_COMPROMISED
 * @param tableAlias
 * - Name or alias of the table containing the cryptographic
 * object data
 * @return SQL search filter to use in WHERE clause of SELECT statement.
 * Method will return empty string when no states are given
 * Interpretation of the empty String is left to the calling code.
 */
public static String generateStateSQL(Integer[] stateValues,
        String tableAlias) {
    // COLUMN names
    final String ACTIVATIONDATE_COLUMN_NAME = "ACTIVATIONDATE";
    final String DESTROYDATE_COLUMN_NAME = "DESTROYDATE";
    final String COMPROMISEDATE_COLUMN_NAME = "COMPROMISEDATE";
    final String DEACTIVATIONDATE_COLUMN_NAME =
    "DEACTIVATIONDATE";
    StringBuffer strBuff = new StringBuffer();
    Timestamp nowTS = new Timestamp(new Date().getTime());
    if (tableAlias != null) {
        tableAlias = tableAlias.trim();
    }
    if (tableAlias != null && tableAlias.length() > 0) {
        tableAlias = " " + tableAlias + ".";
    } else {
        tableAlias = "";
    }
    for (int state : stateValues) {
        if (state == 0) {
            // Do not search for objects with unknown state
            continue;
        }
        boolean closeParenth = false;
        if (strBuff.length() > 0) {
            strBuff.append(" OR (");
            closeParenth = true;
        }
```

FIG. 8B

```
if (state == 1) {
        // state is PRE_ACTIVE
        if (strBuff.length() > 0) {
                strBuff.append(" AND ");
        }
        strBuff.append(" ((" + tableAlias +
                ACTIVATIONDATE_COLUMN_NAME + " IS NULL) ");
        strBuff.append(" OR (" + tableAlias
                + ACTIVATIONDATE_COLUMN_NAME + " > '" +
                nowTS + "')) ");
} else if (state == 2) {
        // state is ACTIVE
        if (strBuff.length() > 0) {
                strBuff.append(" AND ");
        }
                strBuff.append(" (" + tableAlias +
                        ACTIVATIONDATE_COLUMN_NAME
                        + "<= '" + nowTS + "') ");
                strBuff.append(" AND (" + tableAlias +
                        DESTROYDATE_COLUMN_NAME
                        + " IS NULL) ");
                strBuff.append(" AND (" + tableAlias
                        + COMPROMISEDATE_COLUMN_NAME + "
                        IS NULL)");
                strBuff.append(" AND ((" + tableAlias
                        + DEACTIVATIONDATE_COLUMN_NAME + "
                        IS NULL) OR " + " (" + tableAlias +
                        DEACTIVATIONDATE_COLUMN_NAME
                        + " IS NOT NULL AND " + tableAlias
                        + DEACTIVATIONDATE_COLUMN_NAME + "
                        >= '" + nowTS + "')) ");
} else if (state == 4) {
        // state is COMPROMISED
        if (strBuff.length() > 0) {
                strBuff.append(" AND ");
        }
        strBuff.append(" (" + tableAlias +
                COMPROMISEDATE_COLUMN_NAME
                + " IS NOT NULL) ");
        strBuff.append(" AND (" + tableAlias +
                DESTROYDATE_COLUMN_NAME
                + " IS NULL) ");
```

*FIG. 8C*

```
        } else if (state == 5) {
                // state is DESTROYED;
                if (strBuff.length() > 0) {
                        strBuff.append(" AND ");
                }
                strBuff.append(" (" + tableAlias +
                        DESTROYDATE_COLUMN_NAME
                        + " IS NOT NULL) ");
                strBuff.append(" AND (" + tableAlias
                        + COMPROMISEDATE_COLUMN_NAME + " IS NULL)
                        ");
        } else if (state == 6) {
                // state is DESTROYED_COMPROMISED
                if (strBuff.length() > 0) {
                        strBuff.append(" AND ");
                }
                strBuff.append(" (" + tableAlias +
                        COMPROMISEDATE_COLUMN_NAME
                        + " IS NOT NULL) ");
                strBuff.append(" AND (" + tableAlias +
                        DESTROYDATE_COLUMN_NAME
                        + " IS NOT NULL) ");
        } else if (state == 3) {
                // state is DEACTIVATED;
                if (strBuff.length() > 0) {
                        strBuff.append(" AND ");
                }
                strBuff.append(" (" + tableAlias +
                        DEACTIVATIONDATE_COLUMN_NAME
                        + " IS NOT NULL) ");
                strBuff.append(" AND (" + tableAlias
                        + DEACTIVATIONDATE_COLUMN_NAME + "<= '" +
                        nowTS + "') ");
        }
        if (closeParenth) {
                strBuff.append(") ");
        }
    }
    return strBuff.toString();
}
```

US 9,298,767 B1

CALCULATING STATE OF CRYPTOGRAPHIC OBJECTS AND GENERATING SEARCH FILTER FOR QUERYING CRYPTOGRAPHIC OBJECTS

BACKGROUND

The present application relates generally to an improved data processing apparatus and method and more specifically to mechanisms for calculating state of cryptographic objects and generating search filters for querying cryptographic objects based on the given state or on the given combination of unique states.

Cryptography is used to secure many information-technology systems, ranging from encrypting data on storage and establishing virtual private networks to protecting communication with mobile devices and using certificates for e-commerce over the Internet. All uses of cryptography rely on the proper keys being present. Key management deals with the lifecycle of cryptographic keys, with operations for creating, importing, storing, reading, updating, exporting, and deleting keys, and with distributing keys before they are used in cryptographic functions. An important aspect is to manage the attributes of keys that govern their usage and their relation to other keys.

The lifecycle of any cryptographic object, such as a cryptographic key, involves state transitions. Some of these state transitions happen automatically with the passage of time and some are triggered by the keepers of the cryptographic object. Knowing the most up-to-date state of a cryptographic object is required for applications that manage cryptographic objects to make correct decisions about the future disposition of the object or the new state's impact on the object's current use. Consequently, applications that manage cryptographic objects must be able to search for cryptographic objects in a certain state or combination of unique states.

SUMMARY

In one illustrative embodiment, a method, in a data processing system, is provided for managing cryptographic objects. The method comprises storing a set of state altering date values in state meta-data associated with a cryptographic object in a data store, retrieving the set of state altering date values from the data store, and determining a state of the cryptographic object based on the set of state altering date values.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6 is a flowchart illustrating operation of a mechanism for generating a search filter to query for cryptographic objects using the state altering date values stored for each object in accordance with an illustrative embodiment;

FIGS. 7A and 7B depict code for an example implementation of a state calculator mechanism in accordance with an illustrative embodiment; and FIGS. 8A-8C depict code for an example implementation of a mechanism to generate structured query language (SQL) code to search cryptographic objects based on a state or combination of unique states in accordance with an illustrative embodiment.

DETAILED DESCRIPTION

The illustrative embodiments provide a mechanism for calculating state of cryptographic objects and generating search filters for querying cryptographic objects based on the given state or on the given combination of unique states. The illustrative embodiments comprise a mechanism to calculate a state of a cryptographic object and a mechanism to generate a search filter to query for cryptographic objects using a single state or a combination of state values logically ORed together.

The mechanism to calculate a state of a cryptographic object allows an application or system to resolve the current state of any cryptographic object with the following set of state altering date values: initial date, activation date, deactivation date, compromise date, and destroy date. The system stores these date values in a persistent data store for each managed cryptographic object as state meta-data. A processing module may retrieve the state meta-data and calculate the current state of a given cryptographic object. The current state may be, for example, one of the following: unknown, pre-active, active, deactivated, compromised, destroyed, and destroyed-compromised.

The mechanism to generate a search filter may generate a search query language (SQL) search filter to query for cryptographic objects using the state altering date values stored for each object. This mechanism requires that a SQL based data store be used to persist the cryptographic object's data and that there is code in place that is capable of persisting cryptographic objects' meta-data as well as looking it up by its primary key from the data store. The SQL generated by this mechanism may be used in the WHERE clause of a SELECT statement, which when executed, returns objects that are in the given state or objects that are in any state in the given combination of unique states.

The set of possible states are expected to vary depending on the domain, or even within a domain. With the mechanisms of the illustrative embodiments, the set of possible states may vary, and the mechanisms may return an appropriate state regardless of the domain.

Figure 1:
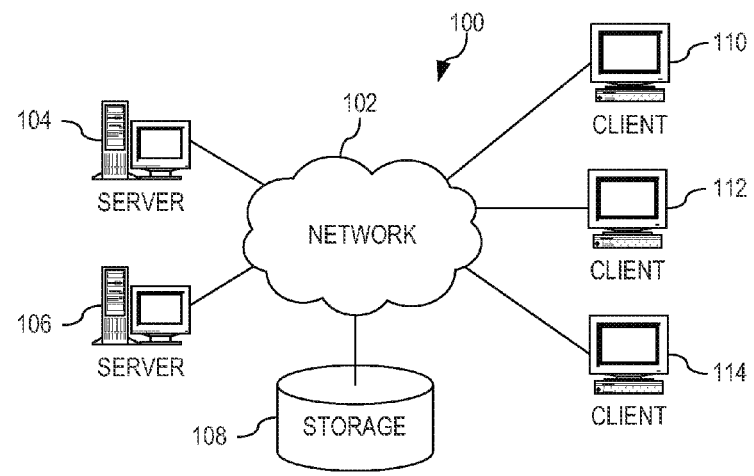
FIG. 1 depicts a pictorial representation of an example distributed data processing system in which aspects of the illustrative embodiments may be implemented.
Figure 2:
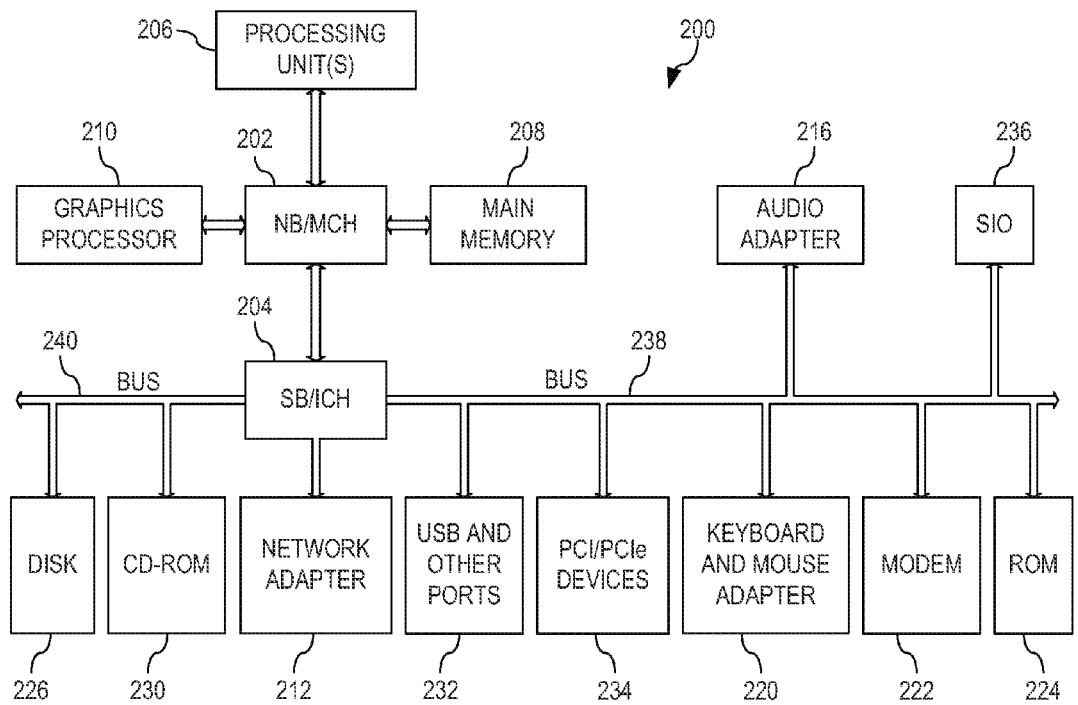
FIG. 2 is a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present invention. To the contrary, the illustrative embodiments are intended to include distributed data processing environments.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® 7 (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Oracle and/or its affiliates in the United States, other countries, or both).

As a server, data processing system 200 may be, for example, an IBM® eServer™ System P® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Returning to FIG. 1, storage 108 may store cryptographic objects, such as cryptographic keys and certificates. Servers 104, 106 and/or clients 110, 112, 114 may run cryptographic object managing applications, such as key lifecycle management (KLM) systems. Alternatively, or in addition, servers 104, 106 and/or clients 110, 112, 114 may implement protocols, such as key management interoperability protocol (KMIP) to exchange information between KLM applications.

Figure 3:
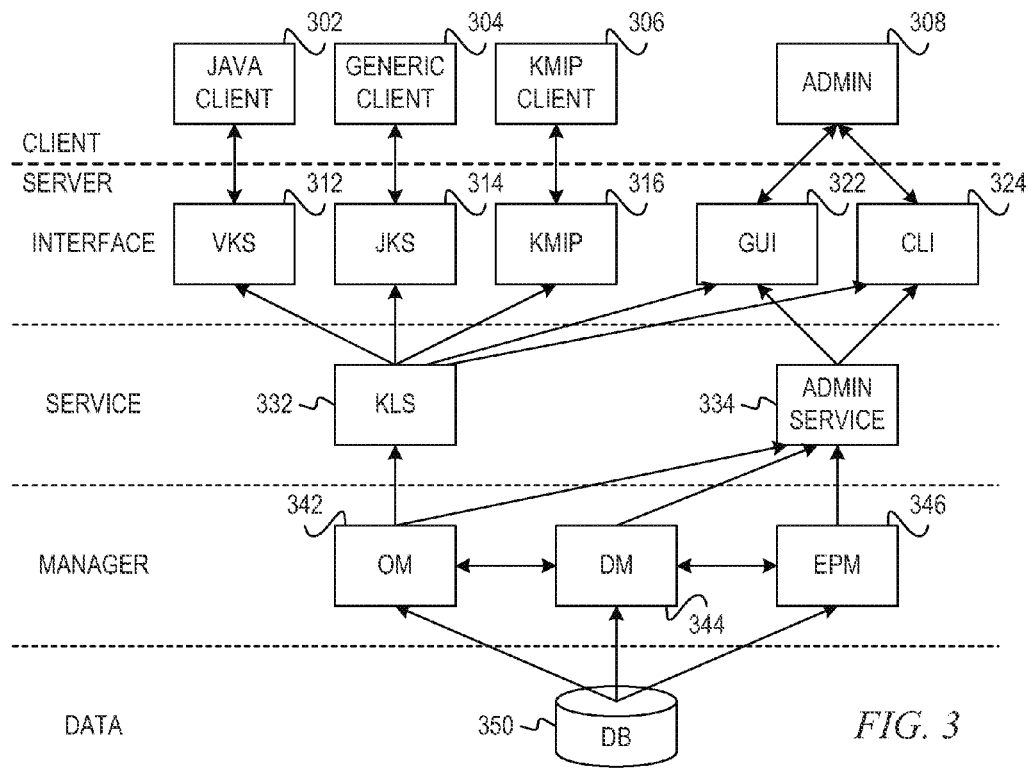
FIG. 3 depicts example architecture of a key lifecycle management system in accordance with an illustrative embodiment.

FIG. 3 depicts example architecture of a key lifecycle management system in accordance with an illustrative embodiment. The key lifecycle management (KLM) system may be implemented in a server, such as a Web server. The KLM system server may interact with the clients through several types of interfaces. Administrators may use a different interface than the clients to access the server. The server itself is structured in four layers, including a data layer, a manager layer, a service layer, and an interface layer.

The data layer stores all information in a persistent database (DB) 350. Internally, DB 350 accesses a standard structured query language (SQL) database through a Java™ database connectivity (JDBC™) interface. JDBC is a trademark of Oracle and/or its affiliates in the United States, other countries, or both. DB 350 stores meta-data about cryptographic objects as well as the cryptographic objects themselves.

The manager layer of the KLM system contains three components that provide low-level functionalities: object manager (OM) 342, deployment manager (DM) 344, and endpoint manager (EPM) 346. OM 342 provides a simple interface to manipulate the cryptographic objects in DB 350. OM 342 can add new objects and read, modify, search, and delete them in DB 350.

DM 344 takes care of administering deployments and deployment bundles. A deployment is an association between an object and an endpoint in the sense that the KLM system provisions the object for use in cryptographic operations by the endpoint. The deployment policy realized by DM 344 dictates when and under which condition a deployed object finally becomes available to an endpoint through an interface. A deployment bundle is a set of deployments, which are grouped to support a given application.

EPM 346 controls the endpoints in the interface layer of the server, registering them in the KLM system, potentially creating new file-backed Java™ keystore (JKS) endpoints, and listening to protocol ports to which KMIP clients connect. EPM 346 unifies the different types of endpoints towards the rest of the server.

The service layer provides two modules: key lifecycle service (KLS) 332, which is used by endpoints and by an administrator, and admin service 334, which is only accessed by the administrator. KLS 332 represents the core of the server. KLS 332 implements all operations related to cryptographic objects that are available to endpoints and to users, drives automated deployment and lifecycle operations in conjunction with DM 334, and enforces access control. KLS 332 can distinguish between different users, the principals that access it; every invocation of an operation occurs in the context of a session, which represents a user that has been securely authenticated by the KLM system.

The admin service 334 controls the allocation of endpoints and deployments through EPM 346 and DM 344, respectively. Access to its operations also occurs in the context of a session, but is restricted to users with the corresponding permission. The admin service 334 also allows archive and recovery operations for individual keys and for the whole database 350. Both modules, KLS 332 and admin service 334, generate audit events.

In the interface layer, three types of endpoint interfaces interact with the clients. The virtual keystore (VKS) interface 312 emulates the provider of a Java™ keystore for Java™ client 302, for applications that are hosted by the same application server as the KLM system. Java™ client 302 reads and writes keys via VKS 312 by issuing the "get" and "set" operations of the Java™ keystore interface. VKS 312 is a pull-style synchronous interface, i.e., KLS 332 can forward client calls to VKS 312 directly to OM 342 and DM 344.

The Java™ keystore (JKS) interface 314 accesses a named Java™ keystore as a client. A Java™ keystore is usually passive and its default implementation is a file, but depending on the installed Java™ cryptography extension (JCE) provider, many different entities, such as generic client 304, may receive key material through the JKS interface 314. In particular, generic client 304 need not be implemented in the Java™ programming language. JKS interface 314 is a push-style asynchronous interface, because KLS calls the Java™ keystore interface and clients may retrieve keys from JKS at a later time.

A protocol interface 316 provides an implementation of the key management interoperability protocol (KMIP). KMIP is mostly a client-to-server protocol that offers rich functionality to manipulate cryptographic objects. Many of its operations can be forwarded directly to KLS 332, but other operations are realized by an adapter module (not shown) inside the KMIP interface 316. Ignoring the optional server-to-client operations in KMIP, the protocol interface is again pull-style and synchronous, similar to VKS interface 312. KMIP clients 306 connecting through KMIP interface 316 need not be implemented in the Java™ programming language.

For the two keystore-based interfaces, EPM 346 statically configures the user with which KLS 332 is accessed. For the protocol-based interface, it is possible to take the user from the client context. For the pull-style interfaces, access control occurs when the client calls KLS 332; for the push-style JKS interface 314, on the other hand, access control must be enforced at the time when the deployment occurs.

Administrators 308 access the KLM system through a Web-based graphical user interface (GUI) 322 or through a command line interface (CLI) 324. The GUI 322 and CLI 324 both provide operations to deal with endpoints and to manage deployments. Note that clients who access the system through one of the endpoint interfaces cannot deploy cryptographic objects in the KLM system.

In accordance with an illustrative embodiment, rather than cryptographic objects comprising an associated state, cryptographic objects store state meta-data that allows the KLM system to resolve the current state. The state meta-data may comprise a set of state altering date values, including the following: initial date, activation date, deactivation date, compromise date, and destroy date. The KLM system stores this state meta-data in association with cryptographic objects in DB 350. The components of the KLM system, such as object manager (OM) 342, key lifecycle service (KLS) 332, virtual keystore (VKS) interface 312, Java™ keystore (JKS) interface 314, and key management interoperability protocol (KMIP) interface 316, may retrieve the state meta-data and calculate the current state of the objects.

Figure 4:
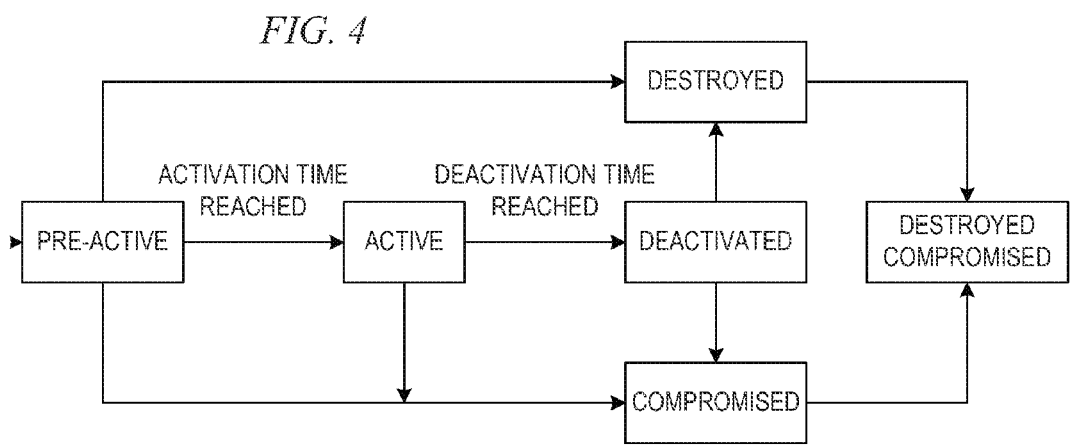
FIG. 4 depicts state transitions for cryptographic objects in accordance with an illustrative embodiment.

FIG. 4 depicts state transitions for cryptographic objects in accordance with an illustrative embodiment. The lifecycle of a cryptographic object begins in a pre-active state, where it is not to be used for any cryptographic operation. When the current time is equal to the activation date/time for the cryptographic object, which is stored in the state meta-data in accordance with the illustrative embodiment, the state of the cryptographic object progresses to an active state, where it may be used to protect and process data. Then, when the current time is equal to the deactivation date/time for the cryptographic object in the state meta-data, the state of the cryptographic object progresses to a deactivated state, where it may at most be used to handle data that has already been processed (may verify data already signed, or decrypt already-encrypted data, and even then usually only with an administrative override, as "deactivated" is supposed to mean "no longer active").

State transitions may be triggered directly by modifications to the lifecycle-relevant attributes, such as the activation time and deactivation time, or indirectly as a side-effect of operations. For example, the cryptographic object may transition from the pre-active state to the destroyed state responsive to a destroy operation. In accordance with the illustrative embodiment, the destroy operation causes a destroy date to be written to the state meta-data rather but does not cause a state to be written to the cryptographic object. The KLM system determines the state of the cryptographic object based on the information in the state meta-data. Therefore, if the cryptographic object's state meta-data has a destroy date set, then the object is destroyed. The cryptographic object may also transition to the destroyed state from the deactivated state, as shown in FIG. 4.

In addition, a compromise operation causes a compromise date to be set in the state meta-data, which results in the cryptographic object transitioning to the compromised state, which may occur from the pre-active, active, or deactivated state. Furthermore, a cryptographic object may have a combination of compromised and destroyed states. That is, implemented a destroyed cryptographic object is found to be compromised, then the compromised operation results in the state meta-data having both a destroyed date/time and a compromised date/time set. Similarly, if the destroy operation is performed on a compromised object, then the state meta-data will have both a destroyed date/time and a compromised date/time set. In these cases, the cryptographic object is in a destroyed-compromised state.

While FIG. 4 depicts a set of known states for a particular example, the set of possible states is expected to vary depending on the domain, or even within a domain. With the mechanisms of the illustrative embodiments, the set of possible states may vary, and the mechanisms may return an appropriate state regardless of the domain.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
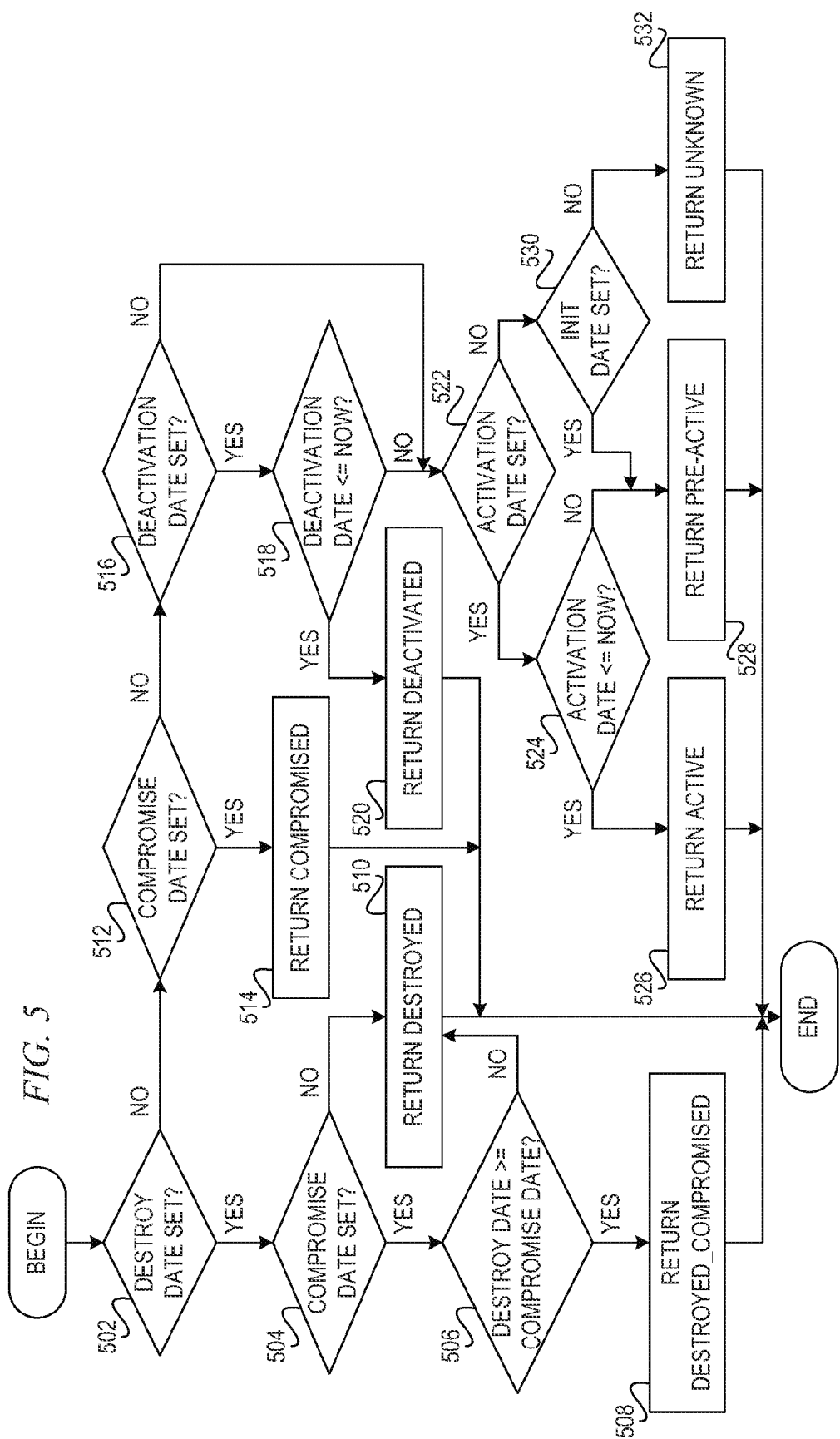
FIG. 5 is a flowchart illustrating operation of a mechanism for determining the state of a cryptographic object in accordance with an illustrative embodiment.

FIG. 5 is a flowchart illustrating operation of a mechanism for determining the state of a cryptographic object in accordance with an illustrative embodiment. Operation begins, and the mechanism determines whether a destroy date is set for the cryptographic object (block 502). If a destroy date is set, the mechanism determines whether a compromise date is set in the state meta-data for the cryptographic object (block 504). If the destroy date is set in block 502 and the compromise date is set in block 504, then the mechanism determines whether the destroy date is greater than or equal to the compromise date (block 506). If the destroy date is greater than or equal to the compromise date, the mechanism returns a state of "destroyed_compromised" (block 508), and operation ends. However, once a cryptographic object has been destroyed, the mechanism may not mark the cryptographic object as compromised. Therefore, if the destroy date is not greater than or equal to the compromise date in block 506, the mechanism may return a state of "destroyed" (block 510), and operation ends. In an alternative embodiment, the mechanism may return a state of "destroyed_compromised" in either case.

If the destroy date is set in block 502 and the compromise date is not set in block 504, then the mechanism returns a state of "destroyed" (block 510), and operation ends. Returning to block 502, if the destroy date is not set, the mechanism determines whether the compromise date is set (block 512). If the destroy date is not set in block 502 and the compromise date is set in block 512, then the mechanism returns a state of "compromised" (block 514), and operation ends.

If the compromise date is not set in block 512, then the mechanism determines whether the deactivation date is set (block 516). If the deactivation date is set, the mechanism determines whether the deactivation date is less than or equal to the current time (block 518). If the deactivation date is less than or equal to the current time, the mechanism returns a state of "deactivated" (block 520), and operation ends.

If the deactivation date is not set in block 516 or is not less than or equal to the current time in block 518, the mechanism determines whether the activation date is set (block 522). If the activation date is set, the mechanism determines whether the activation date is less than or equal to the current time (block 524). If the activation date is less than or equal to the current time, the mechanism returns a state of "active" (block 526), and operation ends. If the activation date is not less than or equal to the current time in block 524, the mechanism returns a state of "pre-active" (block 528), and operation ends.

If the activation date is not set in block 522, the mechanism determines whether an initial date is set (block 530). If the initial date is set, the mechanism returns a state of "pre-active" (block 528); otherwise, the mechanism returns a state of "unknown" (block 532), as the state cannot be determined because the state meta-data does not have any dates. Thereafter, operation ends. The logic in the server always sets an initial date, so in an alternative embodiment, the mechanism may not perform the determination in block 530, which would result in the mechanism returning a state of "pre-active" (block 528) if the activation date is not set in block 522.

FIG. 6 is a flowchart illustrating operation of a mechanism for generating a search filter to query for cryptographic objects using the state altering date values stored for each object in accordance with an illustrative embodiment. Operation begins, and for each search criteria element (block 602), the mechanism locates appropriate structured query language (SQL) condition logic (block 604). The mechanism appends the SQL corresponding to the search criteria element using a logical AND operator (block 606). Then, the mechanism considers the next search criteria element (block 608), and returns to block 602 to repeat the loop for the next search criteria element. If the mechanism has considered the last search criteria element in block 608, then operation ends.

FIGS. 7A and 7B depict code for an example implementation of a state calculator mechanism in accordance with an illustrative embodiment. The code in FIGS. 7A and 7B are written in the Java™ programming language.

FIGS. 8A-8C depict code for an example implementation of a mechanism to generate structured query language (SQL) code to search cryptographic objects based on a state or combination of unique states in accordance with an illustrative embodiment. The mechanism requires that a structured query language (SQL) based data store is used to persist the cryptographic object's data and that there is code in place that is capable of persisting cryptographic object's meta-data as well as looking it up by its primary key from the data store. The SQL schema defines columns that are to be used to store the state altering dates:

```
...
ACTIVATIONDATE TIMESTAMP,
DEACTIVATIONDATE TIMESTAMP,
INITIALDATE TIMESTAMP NOT NULL,
DESTROYDATE TIMESTAMP,
COMPROMISEDATE TIMESTAMP
...
```

The SQL generated by the mechanism may be used in the WHERE clause of a SELECT statement, which when executed, returns objects that are in the given state or objects that are in any state in the given combination of unique states.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for calculating state of cryptographic objects and generating search filters for querying cryptographic objects based on the given state or on the given combination of unique states. The illustrative embodiments comprise a mechanism to calculate a state of a cryptographic object and a mechanism to generate a search filter to query for cryptographic objects using a single state or a combination of state values logically ORed together.

The mechanism to calculate a state of a cryptographic object allows an application or system to resolve the current state of any cryptographic object with the following set of state altering date values: initial date, activation date, deactivation date, compromise date, and destroy date. The system stores these date values in a persistent data store for each managed cryptographic object as state meta-data. A processing module may retrieve the state meta-data and calculate the current state of a given cryptographic object. The current state may be, for example, one of the following: unknown, pre-active, active, deactivated, compromised, destroyed, and destroyed-compromised.

The mechanism to generate a search filter may generate a search query language (SQL) search filter to query for cryptographic objects using the state altering date values stored for each object. This mechanism requires that a SQL based data store be used to persist the cryptographic object's data and that there is code in place that is capable of persisting cryptographic objects' meta-data as well as looking it up by its primary key from the data store. The SQL generated by this mechanism may be used in the WHERE clause of a SELECT statement, which when executed, returns objects that are in the given state or objects that are in any state in the given combination of unique states.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A method, in a data processing system, for managing cryptographic keys, the method comprising:
    storing a set of state altering date values in state meta-data of each cryptographic key in a data store, wherein the set of state altering date values comprises an initial date, an activation date, and a deactivation date;
    retrieving the set of state altering date values from the data store for a given cryptographic key; and
    determining a state of the given cryptographic key based on a combination of the set of state altering date values, wherein the set of state altering date values further comprises a compromise date and a destroy date, wherein determining the state of the given cryptographic key comprises:
    responsive to the destroy date being set and the compromise date not being set, determining that the given cryptographic key is in a destroyed state; and
    responsive to the destroy date not being set and the compromise date being set, determining that the given cryptographic key is in a compromised state.

2. The method of claim 1, wherein determining the state of the given cryptographic key comprises:
    responsive to the deactivation date being set and less than or equal to a current time, determining that the given cryptographic key is in a deactivated state;
    responsive to the deactivation date not being set or greater than the current time and responsive to the activation date being set and less than or equal to the current time, determining that the given cryptographic key is in an active state;

responsive to the deactivation date not being set or greater than the current time and responsive to the activation date being set and greater than the current time, determining that the given cryptographic key is in a pre-active state; and responsive to the deactivation date not being set or greater than the current time and responsive to the activation date not being set and the initial date being set, determining that the given cryptographic key is in an active state.

3. The method of claim 2, wherein determining the state of the given cryptographic key further comprises:

responsive to the deactivation date not being set or greater than the current time and responsive to the activation date not being set and the initial date not being set, determining that the given cryptographic key is in an unknown state.

4. The method of claim 1, further comprising:

generating a search filter to query for cryptographic keys using the set of state altering date values stored for each cryptographic key in the data store, wherein the search filter returns cryptographic keys that are in a given state or a combination of unique states.

5. The method of claim 4, wherein generating the search filter to query for cryptographic keys comprises:

for each search criteria element, locating corresponding search query condition logic and appending the corresponding search query logic to the search criteria element using a logical AND operator.

6. A computer program product comprising a computer readable storage medium having a computer readable program stored therein, wherein the computer readable program, when executed on a computing device, causes the computing device to:

store a set of state altering date values in state meta-data of each cryptographic key in a data store, wherein the set of state altering date values comprises an initial date, an activation date, and a deactivation date;

retrieve the set of state altering date values from the data store for a given cryptographic key; and determine a state of the given cryptographic key based on a combination of the set of state altering date values, wherein the set of state altering date values further comprises a compromise date and a destroy date, wherein determining the state of the given cryptographic key comprises:

responsive to the destroy date being set and the compromise date not being set, determining that the given cryptographic key is in a destroyed state; and responsive to the destroy date not being set and the compromise date being set, determining that the given cryptographic key is in a compromised state.

7. The computer program product of claim 6, wherein determining the state of the given cryptographic key comprises:

responsive to the deactivation date being set and less than or equal to a current time, determining that the given cryptographic key is in a deactivated state;

responsive to the deactivation date not being set or greater than the current time and responsive to the activation date being set and less than or equal to the current time, determining that the given cryptographic key is in an active state;

responsive to the deactivation date not being set or greater than the current time and responsive to the activation date being set and greater than the current time, determining that the given cryptographic key is in a pre-active state; and responsive to the deactivation date not being set or greater than the current time and responsive to the activation date not being set and the initial date being set, determining that the given cryptographic key is in an active state.

8. The computer program product of claim 7, wherein determining the state of the given cryptographic key further comprises:

responsive to the deactivation date not being set or greater than the current time and responsive to the activation date not being set and the initial date not being set, determining that the given cryptographic key is in an unknown state.

9. The computer program product of claim 6, wherein the computer readable program further causes the computing device to:

generate a search filter to query for cryptographic keys using the set of state altering date values stored for each cryptographic key in the data store, wherein the search filter returns cryptographic keys that are in a given state or a combination of unique states.

10. The computer program product of claim 9, wherein generating the search filter to query for cryptographic keys comprises:

for each search criteria element, locating corresponding search query condition logic and appending the corresponding search query logic to the search criteria element using a logical AND operator.

11. An apparatus, comprising:

a processor; and a memory coupled to the processor, wherein the memory comprises instructions which, when executed by the processor, cause the processor to:

store a set of state altering date values in state meta-data of each cryptographic key in a data store, wherein the set of state altering date values comprises an initial date, an activation date, and a deactivation date;

retrieve the set of state altering date values from the data store for a given cryptographic key; and determine a state of the given cryptographic key based on a combination of the set of state altering date values, wherein the set of state altering date values further comprises a compromise date and a destroy date, wherein determining the state of the given cryptographic key comprises:

responsive to the destroy date being set and the compromise date not being set, determining that the given cryptographic key is in a destroyed state; and responsive to the destroy date not being set and the compromise date being set, determining that the given cryptographic key is in a compromised state.

12. The apparatus of claim 11, wherein determining the state of the given cryptographic key comprises:

responsive to the deactivation date being set and less than or equal to a current time, determining that the given cryptographic key is in a deactivated state;

responsive to the deactivation date not being set or greater than the current time and responsive to the activation date being set and greater than the current time, determining that the given cryptographic key is in a pre-active state; and responsive to the deactivation date not being set or greater than the current time and responsive to the activation date not being set and the initial date being set, determining that the given cryptographic key is in an active state.

13. The apparatus of claim 12, wherein determining the state of the given cryptographic key further comprises:

responsive to the deactivation date not being set or greater than the current time and responsive to the activation date not being set and the initial date not being set, determining that the given cryptographic key is in an unknown state.

14. The apparatus of claim 11, wherein the instructions further cause the processor to:

generate a search filter to query for cryptographic keys using the set of state altering date values stored for each cryptographic key in the data store, wherein the search filter returns cryptographic keys that are in a given state or a combination of unique states.

15. The apparatus of claim 14, wherein generating the search filter to query for cryptographic keys comprises:

for each search criteria element, locating corresponding search query condition logic and appending the corresponding search query logic to the search criteria element using a logical AND operator.

16. The method of claim 1, wherein the set of state altering date values further comprises a compromise date and a destroy date.

17. The computer program product of claim 6, wherein the set of state altering date values further comprises a compromise date and a destroy date.

* * * * *